(12) United States Patent  
Gruenstein (10) Patent No.: US 8,489,398 B1  
(45) Date of Patent: Jul. 16, 2013

(54) DISAMBIGUATION OF SPOKEN PROPER NAMES

(75) Inventor: Alexander H. Gruenstein, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/007,528

(22) Filed: Jan. 14, 2011

(51) Int. Cl.  
*G10L 15/04* (2006.01)  
*G10L 15/00* (2006.01)

(52) U.S. Cl.  
USPC .......................................... 704/254; 704/231

(58) Field of Classification Search  
USPC ................................................ 704/231–257  
See application file for complete search history.

(56) References Cited

U.S. PATENT DOCUMENTS

| | | | |
|---|---|---|---|
| 5,212,730 A | 5/1993 | Wheatley et al. | |
| 5,822,727 A | 10/1998 | Garberg et al. | |
| 6,272,464 B1 | 8/2001 | Kiraz et al. | |
| 6,694,055 B2 | 2/2004 | Wu | |
| 6,907,397 B2* | 6/2005 | Kryze et al. | 704/251 |
| 7,716,051 B2* | 5/2010 | Dow et al. | 704/254 |
| 2002/0077811 A1* | 6/2002 | Koenig et al. | 704/201 |
| 2006/0235684 A1* | 10/2006 | Chang | 704/233 |
| 2007/0185714 A1* | 8/2007 | Kim et al. | 704/254 |
| 2008/0201147 A1* | 8/2008 | Han et al. | 704/254 |
| 2008/0255848 A1* | 10/2008 | Yu et al. | 704/270.1 |
| 2009/0012792 A1 | 1/2009 | Low et al. | |
| 2009/0043581 A1* | 2/2009 | Abbott et al. | 704/254 |
| 2009/0070109 A1* | 3/2009 | Didcock et al. | 704/235 |
| 2011/0067059 A1* | 3/2011 | Johnston et al. | 725/39 |

FOREIGN PATENT DOCUMENTS

| | | |
|---|---|---|
| EP | 0 661 690 | 7/1995 |
| EP | 1 693 828 | 8/2006 |

OTHER PUBLICATIONS

Bechet et al. "Very Large Vocabulary Proper Name Recognition for Directory Assistance." IEEE Automatic Speech Recognition and Understanding Workshop, Dec. 9-13, 2001, Madonna di Campiglio, Italy, 4 pages.  
U.S. Non-Final Office Action in U.S. Appl. No. 13/249,401, dated Dec. 7, 2011, 10 pages.  
U.S. Final Office Action in U.S. Appl. No. 13/249,401, dated May 7, 2012, 6 pages.  
U.S. Non-Final Office Action in U.S. Appl. No. 13/249,401, dated Dec. 19, 2012, 9 pages.  
Office Action for U.S. Appl. No. 13/249,401, mailed May 8, 2013, 11 pages.

\* cited by examiner

*Primary Examiner* — Samuel G Neway  
(74) *Attorney, Agent, or Firm* — Fish & Richardson P.C.

(57) ABSTRACT

A method is performed by a communication device that is configured to communicate with a server over a network. The method includes outputting, to the server, speech data for spoken words; receiving, from the server, speech recognition candidates for a spoken word in the speech data; checking the speech recognition candidates against a database on the communication device; and selecting one or more of the speech recognition candidates for use by the communication device based on the checking.

27 Claims, 5 Drawing Sheets

DISAMBIGUATION OF SPOKEN PROPER NAMES

TECHNICAL FIELD

This patent application relates generally to a speech recognition system.

BACKGROUND

Speech recognition systems can have difficulty recognizing proper names, particularly surnames. In the case of mobile telephones, for example, this is addressed by sending a contact list or other information from the mobile telephone to a server performing the speech recognition. For example, a user may speak into a mobile telephone. Along with the resulting speech data, the mobile telephone may send the user's contact list to the speech recognition server. The speech recognition server then uses that contact list to attempt to identify proper names in the speech data. This process, however, can raise privacy concerns.

SUMMARY

Described herein is a process performed by a communication device, such as a mobile telephone, that is configured to communicate with a server over a network. The process may include outputting, to the server, speech data for spoken words; receiving, from the server, speech recognition candidates for a spoken word in the speech data; checking the speech recognition candidates against a database on the communication device; and selecting one or more of the speech recognition candidates for use by the communication device based on the checking.

By checking the speech recognition candidates against the database on the communication device, the foregoing process reduces the need to transmit information that may be private, such as a user's contact list, to the server that performs speech recognition.

The foregoing process may also include one or more of the following features, either alone or in combination.

A selected speech recognition candidate may be used to perform an action on the communication device. One or more trigger words that precede the spoken word may be recognized. The one or more trigger words may correspond to the action performed on the communication device. The speech data may include information indicative of the one or more trigger words.

The communication device may include a mobile telephone, and the database may include a contact list stored on the mobile telephone. The contact list need not be transmitted to the server. The database may include a number of times that each entry in the contact list has been called by the mobile telephone.

Checking the speech recognition candidates against the database may include determining which of the speech recognition candidates is closest to a word in the database.

Determining which of the speech recognition candidates is closest to the word in the database may include determining a similarity metric between the word and each of the speech recognition candidates. The selection process may be performed based on the similarity metric.

Determining which of the speech recognition candidates is closest to the word in the database may include traversing a lattice comprising the speech recognition candidates.

Determining which of the speech recognition candidates is closest to the word in the database may include checking the speech recognition candidates against a list. The selection process may include selecting a first item in the list to match one of the speech recognition candidates. Alternatively, the selection process may include selecting any item in the list that is closest to one of the speech recognition candidates.

All or part of the systems and processes described herein may be implemented as a computer program product that includes instructions that are stored on one or more non-transitory machine-readable storage media, and that are executable on one or more processing devices. All or part of the systems and processes described herein may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

DESCRIPTION OF THE DRAWINGS

Like reference symbols in the various drawings indicate like elements.

DETAILED DESCRIPTION

Described herein is a process performed by a communication device, such as a mobile telephone, that is configured to communicate with a server over a network. The process includes outputting, to a server, speech data corresponding to spoken words; receiving, from the server, two or more speech recognition candidates that correspond to a spoken word in the speech data; identifying the spoken word by checking the two or more speech recognition candidates against a database on the communication device; and using the spoken word to perform an action on the communication device.

For example, a personal computing device (e.g., a communication device) can use speech recognition when speaking commands, when dictating input in order to perform web searches, or when filling in the values of text fields in a user interface. For example, a user may speak search terms that include a proper name (e.g., "Robin Hood") in order to perform a web search. In another example, a user may speak a command into the personal computing device in order to place a phone call (e.g., "call Katherine Smith" spoken into a mobile phone in order for the user to place a call to Katherine Smith, a contact included in the user's contact list stored on their personal computing device). In another example, the user may speak a command to send an email, stating the recipient's name (included in the user's contact list stored on their personal computing device) along with a brief email message (e.g., "Send email to Brian Smith message I'm running late for the meeting"). In another example, the user may speak a command to send a Short Message Service (SMS) text message, stating the recipient's name (included in the user's contact list stored on their personal computing device) along with the text message (e.g., "Send text message to David Jones message Meet me at home for dinner tonight"). For example, the user may speak a proper name as input to the text filed (e.g., the "To" filed) of an electronic mail (email) message.

Figure 1:
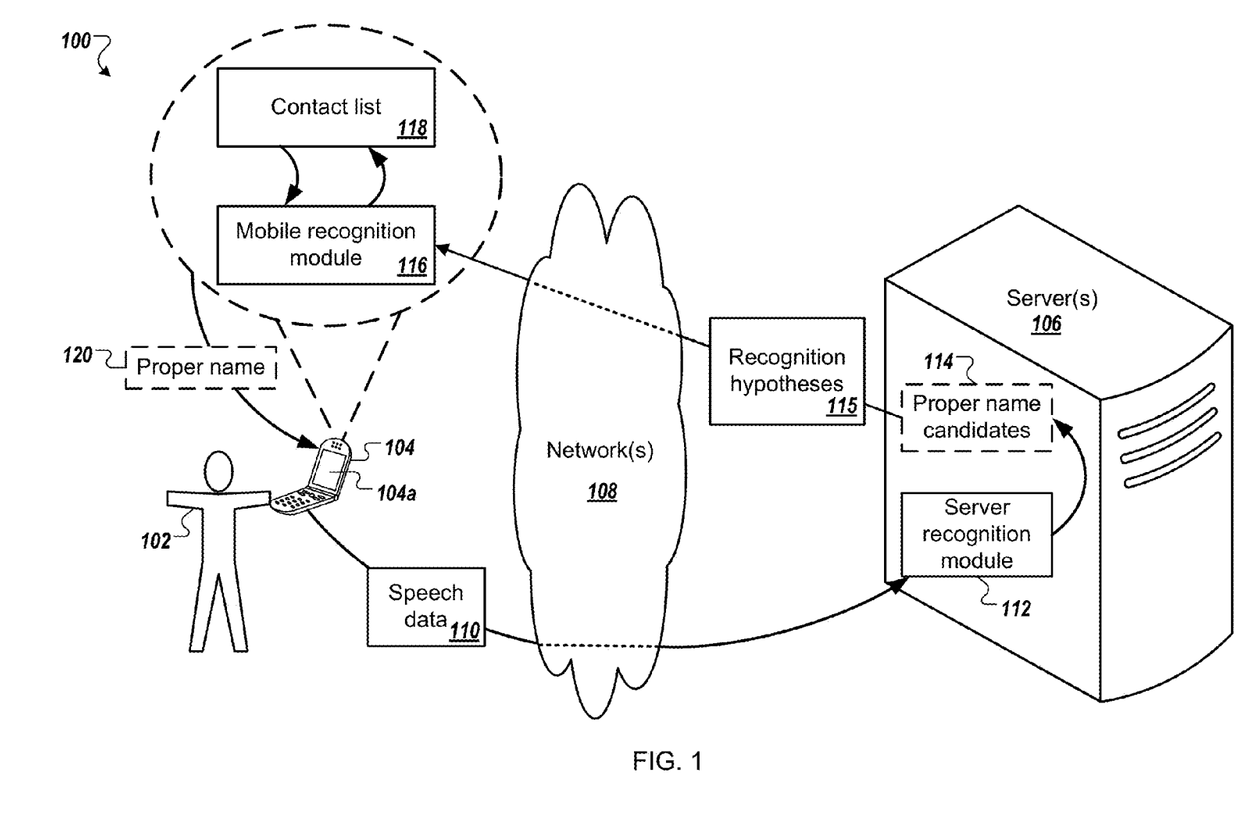
FIG. 1 is a conceptual view of the speech recognition process described herein.

FIG. 1 is a conceptual view 100 of the speech recognition process described herein. The view 100 includes a user 102 operating a communication device 104 (e.g., a mobile telephone) that is in communication with a server 106 by way of a network 108. For example, a user can speak a voice command (e.g., "Call Catherine Jones") into the communication device 104 resulting in speech data 110. The speech recognition process can disambiguate the speech data 110 that can include one or more proper names spoken by the user 102 of the communication device 104. The communication device 104 can send the speech data 110 that includes the user's spoken words to the server 106 by way of network 108. The server 106 can perform the speech recognition on the speech data 110 by combining the use of a speech recognition system included on the server 106 with disambiguation capabilities on a client device (e.g., communication device 104).

The server 106 can include a server recognition module 112 that interprets the speech data 110. The speech data 110 can include recognized vocabulary words (e.g., words found in a dictionary such as "call") along with one or more proper names (e.g., "Catherine Jones"). The server recognition module 112 can be included in a speech recognition system included in the server 106. The server recognition module 112 can determine one or more proper name candidates 114 (e.g., "Catherine", 'Katherine", "Kathryn") for use in recognizing the speech data 110. The server 106 outputs the recognized vocabulary words along with the one or more proper name candidates 114 as recognition hypotheses 115. The server 106 can send the recognition hypotheses 115 to a mobile recognition module 116 included in the communication device 104. The communication device 104 can provide disambiguation capabilities for the recognition hypotheses 115 to determine the proper name included in the speech data 110.

In some implementations, the recognition hypotheses 115 can be in the form of a word lattice the server 106 sends to the mobile recognition module 116 using network 108. The mobile recognition module 116 can access a contact list 118 included on the communication device 104 in order to determine a proper name 120 spoken by the user 102. The mobile recognition module 116 can compare the proper name candidates 114 included in the recognition hypotheses 115 to contact names stored in the contact list 118 for the user 102 of the communication device 104. The mobile recognition module 116 can compare the proper name candidate included in each recognition hypothesis to the contact names stored in the contact list 118 to determine a match, resulting in the proper name 120. For example, the communication device 104 can display to the user 102 the text equivalent of the proper name 120 (e.g., "Catherine Jones") spoken by the user 102 and included in the speech data 110 on a display 104a included on the communication device 104. In another example, the communication device 104 can perform a command identified in the speech data 110 using the identified proper name 120 (e.g., "Call Catherine Jones").

The example speech recognition process shown in FIG. 1 can recognize proper names in speech data without the need for an outside server to store or access an individual user's contact list. This allows a user to retain their contact list on their personal computing device without the need to share the contents of the contact list with the outside server, thus keeping the contents of their contact list private.

Figure 2:
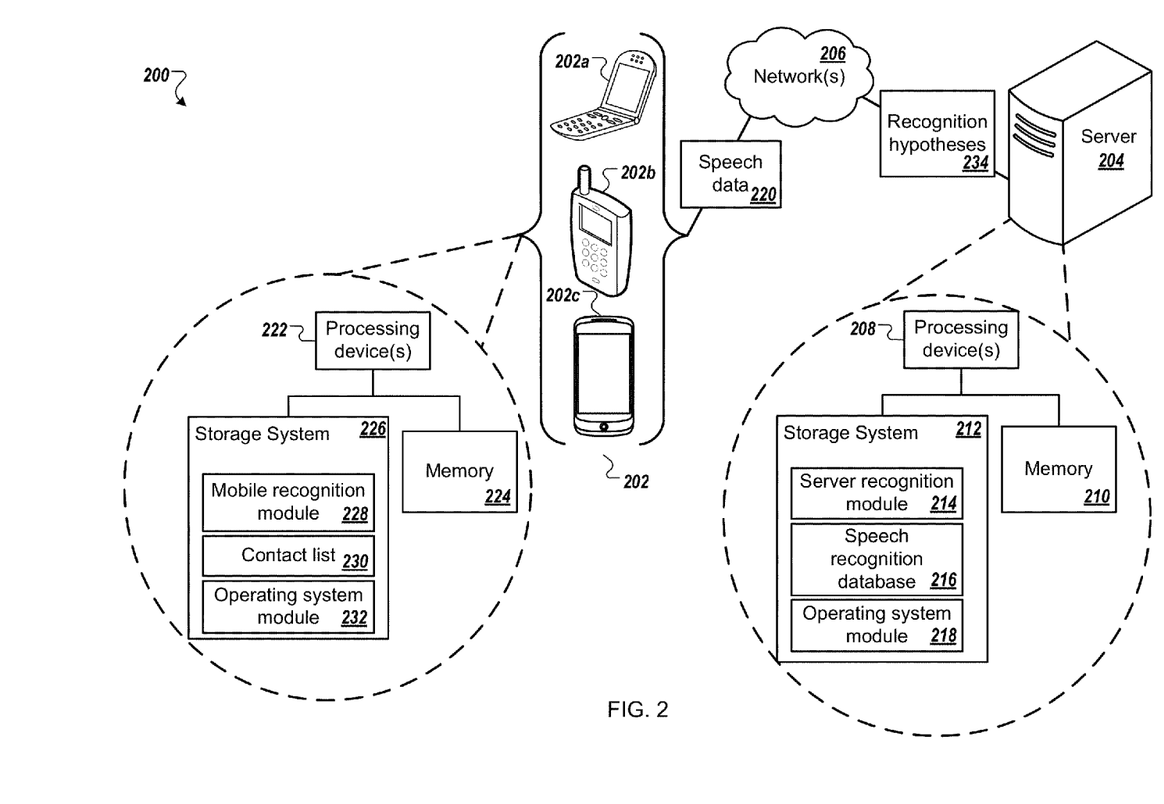
FIG. 2 is a block diagram of an example of a system on which the process of FIG. 1 may be implemented.

FIG. 2 is a block diagram of an example of a system 200 on which the process of FIG. 1 may be implemented. Communication devices 202 can communicate with server 204 by way of network(s) 206. The communication devices 202 can be representative of various forms of client devices and personal computing devices. The communication devices 202 can include a cellular telephone 202a, personal digital assistant (PDA) 202b, and a smartphone 202c. In addition, the client and personal computing devices can further include, but are not limited to, a laptop computer, a handheld computer, a tablet computer, a network appliance, a camera, an enhanced general packet radio service (EGPRS) mobile phone, a media player, a navigation device, an email device, a game console, or a combination of any two or more of these data processing devices or other data processing devices. In some implementations, the personal computing device can be included as part of a motor vehicle (e.g., an automobile, an emergency vehicle (e.g., fire truck, ambulance), a bus). In some implementations, the personal computing device can be included as part of a desktop computer.

The server 204 can represent various forms of servers including, but not limited to, a web server, an application server, a proxy server, a network server, or a server farm. For example, the server 204 can be an application server that executes software accessed by the communication devices 202 by way of network 206. The server 204 can include one or more processing devices 208, a memory 210 and a storage system 212. The storage system 212 can include a server recognition module 214, a speech recognition database 216 and a server operating system module 218. The server 204, using the processing devices 208, can run the operating system included in the server operating system module 218 to execute software included in the server recognition module 214 in order to recognize and identify speech data 220 sent to the server 204 by the one or more communication devices (e.g., cellular telephone 202a) using the network 206.

The network 206 can represent a mobile communications network that can allow devices (e.g., communication devices 202) to communicate wirelessly through a communication interface (not shown), which may include digital signal processing circuitry where necessary. The network 206 can include one or more networks available for use by the communication devices 202 for communication with the server 204. The network(s) may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver. In addition, short-range communication may occur, such as using a Bluetooth, WiFi, or other such transceiver.

The communication devices 202 may each include one or more processing devices 222, a memory 224 and a storage system 226. The storage system 226 can include a mobile recognition module 228, a contact list 230 and a mobile operating system module 232. A communication device (e.g., cellular telephone 202a), using the one or more processing devices 222, can use the operating system included in the mobile operating system module 232 to execute software included in the mobile recognition module 228 in order to select a recognition hypothesis from the recognition hypotheses 234. The server 204 can send the recognition hypotheses 234 to the communication device (e.g., cellular telephone 202a) using the network 206 in response to the receipt and processing of the speech data 220 by the server recognition module 214.

The server recognition module 214 can process the received speech data 220 from the communication device (e.g., cellular telephone 202a) to determine the spoken word content of the speech data 220. The server recognition module 214 can use the speech recognition database 216 in order to determine if any of the identified spoken word content includes one or more proper names. For example, the speech recognition database 216 can include general word entries (e.g., a word dictionary) for use in determining the spoken words in the speech data 220. The speech recognition database 216 can also include proper name entries (e.g., a proper name dictionary) for use in determining if any proper names are included in the speech data 220.

The proper name entries can be a collection of proper names made by the server 204 based on proper name data and information gathered from additional databases and applications some of which may be located outside of the server 204. For example, the server 204 may have access to a public phone book that includes proper names. The server 204 may choose to use all or a portion of the proper names included in the public phone book for inclusion as proper names entries in the speech recognition database 216. In another example, the server 204 may have access to user contact lists stored on the server 204. The server 204 may determine proper names from the contacts included in the stored contact lists for inclusion in the speech recognition database 216. For example, though each contact list may be for an individual user, the accumulated contacts for inclusion in the speech recognition database 216 may not necessarily be associated with any particular user in order to maintain the privacy of the user.

The server recognition module 214 can compare the speech data 220 received by the server 204 to the word and proper name entries included in the speech recognition database 216 to determine the spoken words included in the speech data 220. The server recognition module 214 can determine one or more recognition hypotheses 234 for each proper name identified in the speech data 220. In some cases, the server recognition module 214 can determine the inclusion of a proper name in the speech data 220 based on the matching of the identified spoken word(s) with a proper name included in the speech recognition database 216. In other cases, the server recognition module 214 can determine a proper name based on it not matching any of the general word entries in the speech recognition database 216. In this case, for example, the server recognition module 214 can provide a ranked list of proper name candidates for the identified proper name. In another example, the server recognition module 214 can provide a word lattice that includes multiple recognition hypotheses for the identified proper name. In some cases, the server 204 can rank the recognition hypotheses. The recognition hypotheses can include phonetically similar proper names. The recognition hypotheses can include a compound word representation of the proper name using phonetically similar representations of each compound word.

In the example of FIG. 2, the server 204 can send the recognition hypotheses 234 to the one or more communication devices 202 (e.g., cellular telephone 202a). The memory 224 can store recognition hypotheses 234 on the communication device (e.g., cellular telephone 202a) for use by the mobile recognition module 228. The mobile recognition module 228 can determine the proper name spoken by the user of the communication device and included in the speech data 220. The mobile recognition module 228 can compare proper name candidates included in the recognition hypotheses 234 to the entries in the contact list 230 to determine one or more matches. For example, if the recognition hypotheses 234 are a ranked list of hypotheses returned by the server 204, the highest ranking hypothesis that includes a proper name candidate that matches an entry included in the contact list 230 will be determined as the proper name in the speech data 220. In another example, if the recognition hypotheses 234 are in the form of a word lattice, the first hypothesis that includes a proper name candidate that matches an entry in the contact list 230 can be considered the proper name in the speech data 220.

In some implementations, when using a ranked list of recognition hypotheses or a word lattice of recognition hypotheses, the communication device (e.g., cellular telephone 202a) may determine that the first proper name candidate included in the recognition hypotheses 234 to match an entry in the contact list 230 is the proper name included in the speech data 220. In some implementations, the communication device (e.g., cellular telephone 202a) may use every recognition hypothesis included in the recognition hypotheses 234 to determine one or more matches between a proper name included in each hypothesis and the entries in the contact list 230. For example, if there are multiple matches between the proper name candidates included in the recognition hypotheses 234 and the entries in the contact list 230, the communication device may determine the proper name in the speech data 220 to be the most commonly accessed entry in the contact list 230 from among the identified matches. The communication device can include data for each entry in the contact list 230 that indicates its usage by the user of the communication device (e.g., the inclusion of the contact in a "favorites" list). In another example, if there are multiple matches between proper names included in the recognition hypotheses 234 and the entries in the contact list 230, the communication device may determine the proper name in the speech data 220 to be the highest ranked (by the server 204) recognition hypothesis. In another example, the recognition hypotheses 234 can be represented using a word lattice. If there are multiple matches between the proper names included in the recognition hypotheses 234 and the entries in the contact list 230, the communication device may determine the proper name in the speech data 220 to be the highest ranked or most common recognition hypothesis (as determined by the server 204).

Components of FIG. 2 may be similar, or identical, to counterparts of FIG. 1. For example, servers 106 and 204 may be identical in structure and function, and devices 104 and 200 may be identical in structure and function.

Figure 3:
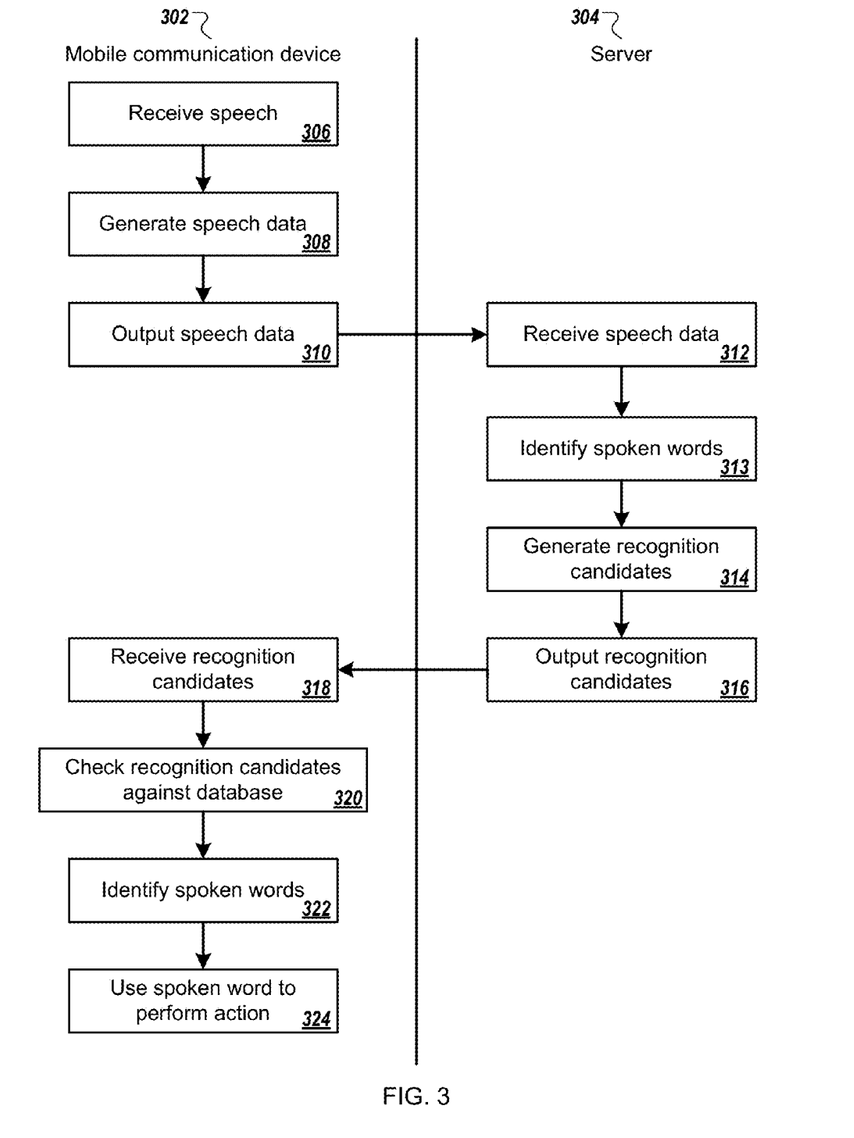
FIG. 3 is a flowchart showing the speech recognition process of FIG. 1.

FIG. 3 is a flowchart showing the speech recognition process of FIG. 1. The process of FIG. 3 shows the functions included in a mobile communication device 302 and a server 304 and the interactions between the mobile communication device 302 and the server 304.

Referring to both FIG. 3 and FIG. 1, the mobile communication device 302 (e.g., communication device 104) receives speech input (306). For example, the user 102 can speak into the communication device 104 a command that includes a proper name (e.g., "Call Catherine Jones"). The mobile communication device 302 generates speech data (308). The speech data (e.g., speech data 110) can include the command or trigger word (e.g., "call") and the proper name (e.g., "Catherine Jones"). The mobile communication device 302 outputs the speech data to the server 304 (310). The server 304 receives the speech data (312). The server identifies spoken words (313). For example, the server 304 identifies the words "call", "Catherine" and "Jones". The server 304 generates recognition candidates (314). The recognition candidates can be recognition hypotheses (e.g., recognition hypotheses 115) for the speech data. The server 304 can generate recognition candidates by comparing the received speech data to information stored in a speech recognition database (e.g., speech recognition database 216 (as shown in FIG. 2)). The recognition candidates can include a ranked ordered list or a word lattice of recognition hypotheses for the speech data. The server 304 outputs the recognition candidates (316). After outputting the recognition candidates, server 304 may delete the speech data so that it is not permanently stored there.

The mobile communication device 302 receives the recognition candidates (318). The mobile communication device 302 checks the recognition candidates against a database (320). The mobile communication device 302 can check the recognition candidates (e.g., a ranked ordered list or a word lattice of recognition hypotheses for the speech data) against a database (e.g., the contact list 118) to determine one or more matches between proper name candidates included in the recognition candidates and the content of the database. The mobile communication device 302 identifies the spoken words (322). The mobile communication device 302 determines a match between a proper name included in a recognition candidate and the database (e.g., the contact list 118) based on techniques previously described with reference to FIG. 2. For example, the mobile communication device 302 identifies "Catherine Jones" as the proper name from comparing the recognition candidates (recognition hypotheses 234) to the database (e.g., contact list 118) on the mobile communication device 302. The mobile communication device 302 uses the identified spoken words to perform the action (324). For example, the mobile communication device 302 uses the identified spoken words "Call Catherine Jones" to place a phone call to Catherine Jones.

In some implementations, the mobile communication device may present the user with options as to which entries from the contact list are closest to the recognition candidate(s). The user may the select, manually, a desired option, whereafter the device may perform the requested operation using that selection.

Figure 4A:
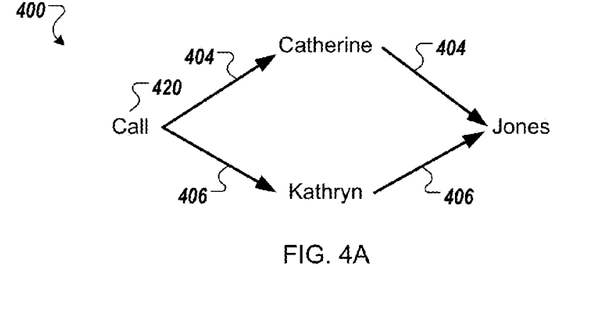
FIGS. 4A and 4B graphically depict ways of identifying words.
Figure 4B:
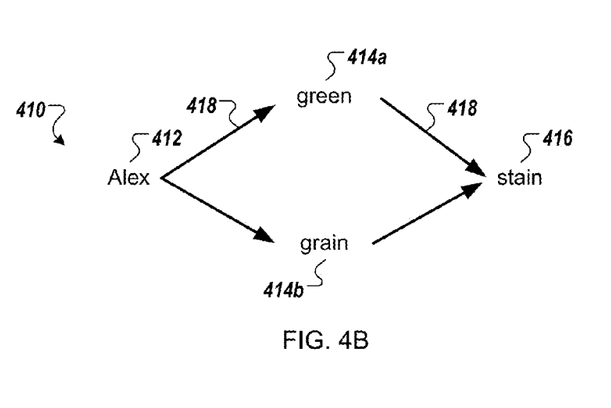

FIGS. 4A and 4B graphically depict ways of identifying words. As described, a server can use a speech recognition system included on the server to identify proper names included in speech data received from a communication device and spoken by a user. The speech recognition system can identify the proper names included in the speech data using a speech recognition database that need not incorporate the user's personal information (e.g., names in a user's contact list or address book) in the database but that may use general information gathered from other sources. The user's communication device can send the speech data that includes a proper name to the server and the server can return recognition hypotheses to the user's communication device for the speech data. The user's communication device can perform disambiguation of the speech data on the communication device.

In some implementations, a server can return a word lattice that represents speech recognition hypotheses for use by the communication device for disambiguation of the proper name included in the speech data. FIGS. 4A and 4B illustrate the use of a word lattice 400 and a word lattice 410, respectively, to represent recognition hypotheses for use in identifying a proper name included in speech data.

FIG. 4A shows the word lattice 400 of recognition hypotheses for speech data that includes a proper name that has multiple phonetically identical representations. Each hypothesis begins with the word "call" 402, which can indicate that a contact name (a proper name) will follow. The word "call" 402 can be referred to as a trigger word, indicating a proper name will follow. In some implementations, this semantic knowledge can be included in a server. The server can then know that the speech data following the word "call" will have a high probability of being a proper name. In some implementations, the semantic knowledge can be included on a client device (e.g., a user's communication device). The client device will then know that a recognition candidate word following the word "call" 402 will have a high probability of being a proper name. In some implementations, both the server and the client device can include the semantic knowledge.

In the example shown in FIG. 4A, there are two possible contact names given by the paths 404, 406 in the word lattice 400: "Catherine Jones" or "Kathryn Jones", respectively. In the example of FIG. 4A, the server ranked the paths 404, 406 in the word lattice 400 according to their likelihood of their occurrence where path 404 is higher in the word lattice 400 than path 406 and therefore the hypothesis represented by path 404 is more likely to occur. The server may determine a rate of occurrence of a proper name in speech data based on information and data gathered from one or more sources that use proper names. For example, the sources can include but are not limited to electronic phone books, server accessible contact lists and electronic address books. In the example of FIG. 4A, the server has ranked the likelihood of the occurrence of "Catherine" as a proper name higher that the likelihood of the occurrence of "Kathryn" as a proper name in the speech data.

The communication device can check its local contact list (e.g., address book) against each recognition hypothesis in their order of ranking until a match occurs. Once the match occurs, the communication device can use the identified proper name in the command. For example, referring to FIG. 4A, the communication device can first check path 404 to determine if "Catherine Jones" is an entry in the user's contact list. If a match occurs, the communication device can execute a "Call Catherine Jones" command to place a phone call to Catherine Jones. In some cases, though a match occurs, the communication device may continue to check each hypothesis included in the word lattice 400 for any additional matches. For example, if "Kathryn Jones" is also an entry in the user's contact list, the communication device may use other techniques to make a determination of the spoken words. For example, the communication device may select the contact most frequently used by the user. In another example, the communication device may select the contact last accessed by the user. The communication device can use data associated with the contact list to make a determination as to the matched contact list entry to select.

In another example, if "Catherine Jones" is not an entry in the user's contact list, the communication device will next check for the entry "Kathryn Jones" in the user's contact list. If a match occurs, the communication device can execute a "Call Kathryn Jones" command to place a phone call to Kathryn Jones.

In some cases, if the communication device checks both path 404 and 406 against entries in the user's contact list and no match occurs, the communication device may inform the user that the spoken words were not recognized. For example, the communication device may ask the user to re-speak the words. In another example, the communication device may provide the user with a list of candidates from the user's contact list that are closest to the spoken word, and allow the user to select one of those candidates manually.

FIG. 4B shows a word lattice 410 of recognition hypotheses for a proper name (Alex Gruenstein) that includes "out of vocabulary" components. For example, the server can recognize the proper name as including multiple components. The server can hypothesize candidates that are close matches to each identified component of the proper name where the candidates are included in a speech recognition database as proper name candidates and vocabulary words. In the example of FIG. 4B, the proper name spoken by the user is "Alex Gruenstein". The server recognizes "Alex" 412 and partitions "Gruenstein" into a first portion ("gruen") and a second portion ("stein"). In the example of FIG. 4B, the server hypothesizes the second portion as the word "stain" 416. The server proposes two hypotheses for the first portion "gruen": the word "green" 414a and the word "grain" 414b. The server can determine the hypotheses for each portion as the closest match to a word included in a speech recognition database. The server can make the determination based on the difference between the letters included in the portion and the letters included in the hypothesized word. For example, the portion "stein" and the word "stain" differ by one letter ("e" in "stein" and "a" in "stain"). This difference between the portion and the hypothesized word can be referred to as the edit distance between the words, where the edit distance is the number of letters to change in a word to make it appear as another word.

In addition, the server can make the determination of the hypotheses for the first portion based on the edit distance of the first portion compared to words included in the speech recognition database. In the example of FIG. 4B, the server determines the words: "green" and "grain" as possible word matches based on their edit distance with respect to the word "gruen". The server can output the word lattice 410 as recognition hypotheses to a client device (e.g., the user's communication device) using systems and methods described in this document.

For example, upon receiving the recognition hypotheses in the form of the word lattice 410, the user's communication device may determine that the spoken proper name is the dictated input to the "To" field of an email message. Having this semantic knowledge, the communication device may assume that the user is dictating the name of an existing entry in a contact list stored on their communication device. The communication device, using a speech recognition module, can compare the hypotheses in the word lattice 410 to the proper name entries included in the contact list. The communication device can calculate a similarity metric between each path through the word lattice 410 and each entry in the user's contact list. The communication device can consider the match most similar to a hypothesis as the proper name spoken by the user. For example, entries in a user's contact list can include "Alex Anderson", "Alex Gruenstein" and "Bryan Madison".

In one example, path 418 is included as the first or top path in the word lattice 410. The server can determine the hypothesis represented by the path 418 in the word lattice 410 includes the most likely proper name candidate. The communication device can calculate similarity scores between the path 418 in the word lattice 410 and the entries in the contact list. The similarity scores can result in the ranking of the contact list entries from most likely recognition candidates (contact list entries most similar to the proper name represented by the path 418) to least likely recognition candidates (contact list entries least similar to the proper name represented by the path 418). In this example, the ranking of the entries in the contact list compared to the path 418 would be "Alex Gruenstein", "Alex Anderson" and "Bryan Madison".

The communication device can then use the contact "Alex Gruenstein" as the dictated name to include in the "To" filed of the email message.

In another example, the communication device can calculate similarity scores between each path included in a word lattice and the entries in the contact list. The communication device may then determine the most frequent occurrence of a ranked contact list entry as the recognized proper name speech input.

Partitioning a proper name into hypothesized recognizable word components can allow the use of a speech recognition database that includes commonly used words along with proper names in order to recognize the proper name. This is beneficial particularly in the case where the proper name may be an "out of vocabulary" word for the speech recognition database.

In some implementations, the recognition hypotheses returned to the communication device can be in the form of a ranked list of n (n≧1) best hypotheses. The communication device can use techniques similar to those described in this document to determine matches between each ranked hypothesis and entries in a user's contact list.

In some implementations, the generation of recognition hypotheses by the server to send to the communication device for performing disambiguation on the communication device can reduce the number of proper name entries included in a speech recognition database on the server. This can reduce the complexity of the software required on both the server and the communication device as latency can be decreased due to reduced computational requirements.

Figure 5:
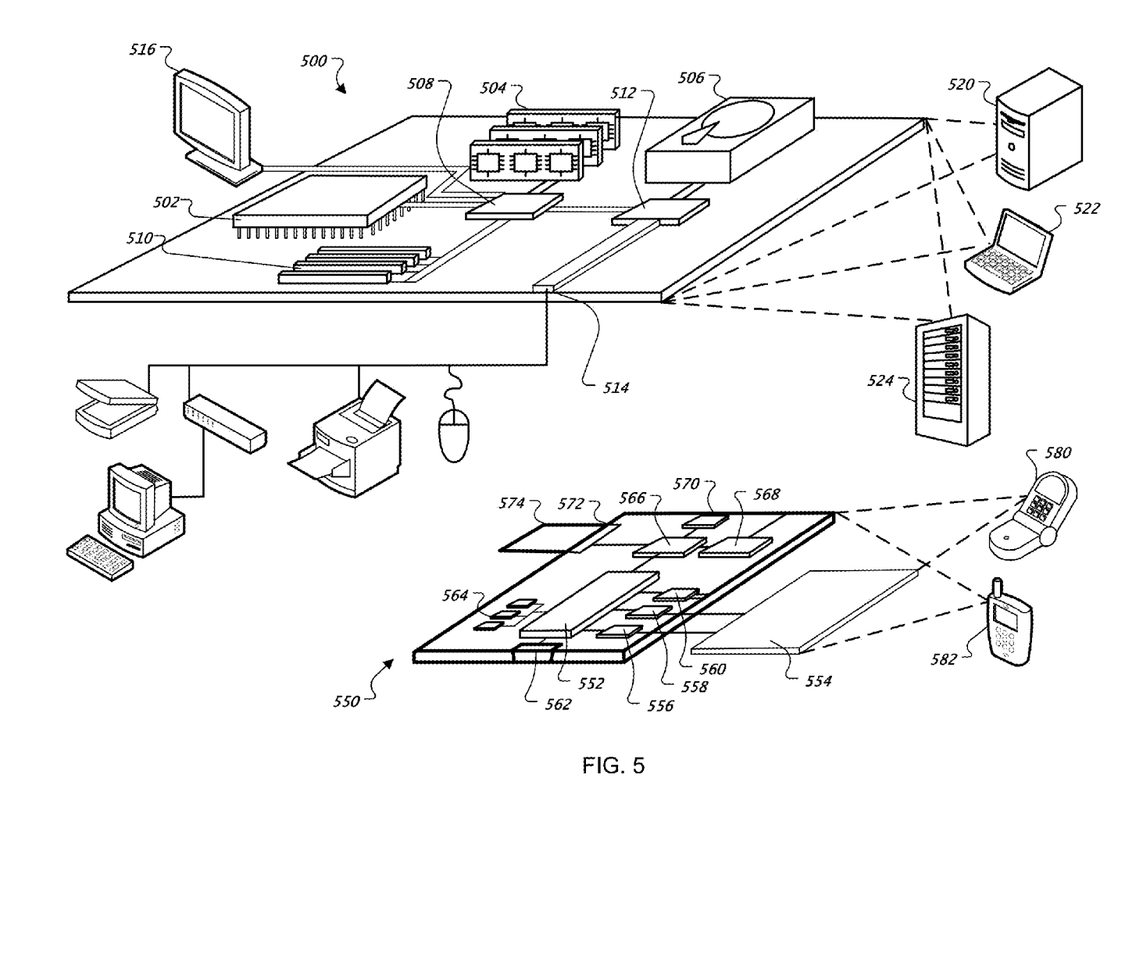
FIG. 5 shows an example of a computer device and a mobile computing device that can be used to implement the processes described herein.

FIG. 5 shows an example of a generic computer device 500 and a generic mobile computer device 550, which may be used to implement the processes described herein, including the speech recognition process shown in FIGS. 1 and 3 and the various processing performed by the components shown in FIG. 2 (e.g., the servers, clients, communication devices, and others). Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the systems described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable medium, such as the memory 504, the storage device 506, memory on processor 502, or the like. For example, the information carrier may be a non-transitory, machine-readable storage medium.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574 or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, Wi-Fi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the described implementations.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Elements of different implementations described herein may be combined to form other implementations not specifically set forth above. Elements may be left out of the processes, computer programs, etc. described herein without adversely affecting their operation. Furthermore, various separate elements may be combined into one or more individual elements to perform the functions described herein.

Other implementations not specifically described herein are also within the scope of the following claims.

What is claimed is:

1. A method performed by a server configured to communicate with a communication device over a network, the method comprising:
    receiving, from the communication device, speech data for spoken words comprising a proper name;
    performing speech recognition on the received speech data comprising:
        recognizing the proper name as comprising one or more components, wherein each component is a word;
        determining that a component of the one or more components is a word that does not match vocabulary words included in a speech recognition database;
        identifying, based on determining that the component is a word that does not match any of the vocabulary words included in the speech recognition database, a speech recognition candidate for the received speech data, the speech recognition candidate comprising multiple words that approximate the component, wherein identifying comprises:
            partitioning the component into portions, wherein an individual portion comprises a word that includes a plurality of letters;
            determining, for each individual portion, a closest match between the portion and a vocabulary word included in the speech recognition database based on the difference between letters included in the portion and letters included in the vocabulary word;
            using, for each individual portion and based on determining a closest match between the portion and a vocabulary word included in the speech recognition database, the vocabulary word as one of the multiple words that approximate the component; and
        outputting, to the communication device, the speech recognition candidate for the received speech data.

2. The method of claim 1, further comprising:
    comparing, by the communication device, the speech recognition candidate to entries of a proper name database; and
    determining, by the communication device, a match most similar to the speech recognition candidate as the spoken proper name.

3. The method of claim 2, wherein comparing, by the communication device, the speech recognition candidate to entries of a proper name database comprises calculating a similarity metric between the speech recognition candidate and each entry in the proper name database.

4. The method of claim 3, wherein determining, by the communication device, the match most similar to the speech recognition candidate as the spoken proper name further comprises:
    ranking the entries in the proper name database based on the similarity metric; and
    identifying the top ranked entry in the proper name database as the spoken proper name.

5. The method of claim 2, wherein the communication device comprises a mobile telephone, and the proper name database comprises a contact list stored on the mobile telephone.

6. The method of claim 5, wherein the contact list is not transmitted to the server.

7. The method of claim 5, wherein the proper name database comprises a number of times that each entry in the contact list has been called by the mobile telephone.

8. The method of claim 1, wherein the difference between the letters included in the portion and the letters included in the vocabulary word is the number of letters that are different between the portion and the vocabulary word.

9. The method of claim 2, further comprising:
    recognizing one or more trigger words that precede the spoken words, wherein the one or more trigger words correspond to an action; and
    using, by the communication device, the match most similar to the speech recognition candidate when performing the action on the communication device.

10. A server comprising:
    memory for storing instructions and a database; and
    one or more processing devices for executing the instructions to perform operations comprising:
        receiving, from the communication device, speech data for spoken words comprising a proper name;
        performing speech recognition on the received speech data comprising:
            recognizing the proper name as comprising one or more components, wherein each component is a word;
            determining that a component of the one or more components is a word that does not match vocabulary words included in a speech recognition database;
            identifying, based on determining that the component is a word that does not match any of the vocabulary words included in the speech recognition database, a speech recognition candidate for the received speech data, the speech recognition candidate comprising multiple words that approximate the component, wherein identifying comprises:
                partitioning the component into portions, wherein an individual portion comprises a word that includes a plurality of letters;
                determining, for each individual portion, a closest match between the portion and a vocabulary word included in the speech recognition database based on the difference between letters included in the portion and letters included in the vocabulary word;
                using, for each individual portion and based on determining a closest match between the portion and a vocabulary word included in the speech recognition database, the vocabulary word as one of the multiple words that approximate the component; and
        outputting, to the communication device, the speech recognition candidate for the received speech data.

11. The method of claim 10, wherein the operations further comprise:
    comparing, by the communication device, the speech recognition candidate to entries of a proper name database; and
    determining, by the communication device, a match most similar to the speech recognition candidate as the spoken proper name.

12. The method of claim 11, wherein the operation of comparing, by the communication device, the speech recognition candidate to entries of a proper name database further comprises calculating a similarity metric between the speech recognition candidate and each entry in the proper name database.

13. The method of claim 12, wherein the operation of determining, by the communication device, the match most similar to the speech recognition candidate as the spoken proper name further comprises:
    ranking the entries in the proper name database based on the similarity metric; and
    identifying the top ranked entry in the proper name database as the spoken proper name.

14. The method of claim 11, wherein the communication device comprises a mobile telephone, and the proper name database comprises a contact list stored on the mobile telephone.

15. The method of claim 14, wherein the contact list is not transmitted to the server.

16. The method of claim 14, wherein the proper name database comprises a number of times that each entry in the contact list has been called by the mobile telephone.

17. The method of claim 10, wherein the difference between the letters included in the portion and the letters included in the vocabulary word is the number of letters that are different between the portion and the vocabulary word.

18. The method of claim 11, wherein the operations further comprise:
    recognizing one or more trigger words that precede the spoken words, wherein the one or more trigger words correspond to an action; and
    using, by the communication device, the match most similar to the speech recognition candidate when performing the action on the communication device.

19. One or more non-transitory machine-readable storage media comprising instructions that are executable by a communication device to perform operations comprising:
    receiving, from the communication device, speech data for spoken words comprising a proper name;
    performing speech recognition on the received speech data comprising:
        recognizing the proper name as comprising one or more components, wherein each component is a word;
        determining that a component of the one or more components is a word that does not match vocabulary words included in a speech recognition database;
        identifying, based on determining that the component is a word that does not match any of the vocabulary words included in the speech recognition database, a speech recognition candidate for the received speech data, the speech recognition candidate comprising multiple words that approximate the component, wherein identifying comprises:
            partitioning the component into portions, wherein an individual portion comprises a word that includes a plurality of letters;
            determining, for each individual portion, a closest match between the portion and a vocabulary word included in the speech recognition database based on the difference between letters included in the portion and letters included in the vocabulary word;

using, for each individual portion and based on determining a closest match between the portion and a vocabulary word included in the speech recognition database, the vocabulary word as one of the multiple words that approximate the component; and outputting, to the communication device, the speech recognition candidate for the received speech data.

20. The machine-readable storage media of claim 19, wherein the operations further comprise:

comparing, by the communication device, the speech recognition candidate to entries of a proper name database; and determining, by the communication device, a match most similar to the speech recognition candidate as the spoken proper name.

21. The machine-readable storage media of claim 20, wherein the operation of comparing, by the communication device, the speech recognition candidate to entries of a proper name database further comprises calculating a similarity metric between the speech recognition candidate and each entry in the proper name database.

22. The machine-readable storage media of claim 21, wherein the operation of determining, by the communication device, the match most similar to the speech recognition candidate as the spoken proper name further comprises:

ranking the entries in the proper name database based on the similarity metric; and identifying the top ranked entry in the proper name database as the spoken proper name.

23. The machine-readable storage media of claim 20, wherein the communication device comprises a mobile telephone, and the proper name database comprises a contact list stored on the mobile telephone.

24. The machine-readable storage media of claim 23, wherein the contact list is not transmitted to the server.

25. The machine-readable storage media of claim 23, wherein the proper name database comprises a number of times that each entry in the contact list has been called by the mobile telephone.

26. The machine-readable storage media of claim 19, wherein the difference between the letters included in the portion and the letters included in the vocabulary word is the number of letters that are different between the portion and the vocabulary word.

27. The machine-readable storage media of claim 20, wherein the operations further comprise:

recognizing one or more trigger words that precede the spoken word, wherein the one or more trigger words correspond to an action; and using, by the communication device, the match most similar to the speech recognition candidate when performing the action on the communication device.

\* \* \* \* \*